INVENTOR
GORDON VICTOR GREATOREX
BY
Watson, Cole, Grindle & Watson
ATTORNEYS

Feb. 9, 1960          G. V. GREATOREX          2,924,098
CIRCUITS FOR OBTAINING INDICATIONS DEPENDENT ON CAPACITANCE
Filed June 19, 1957          2 Sheets-Sheet 2
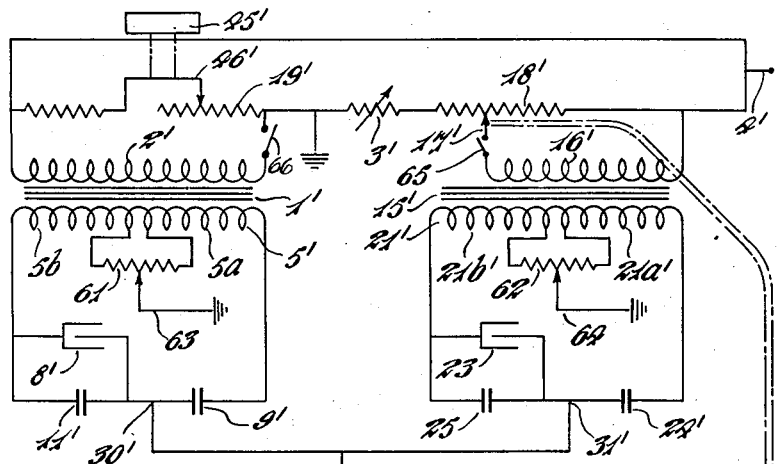
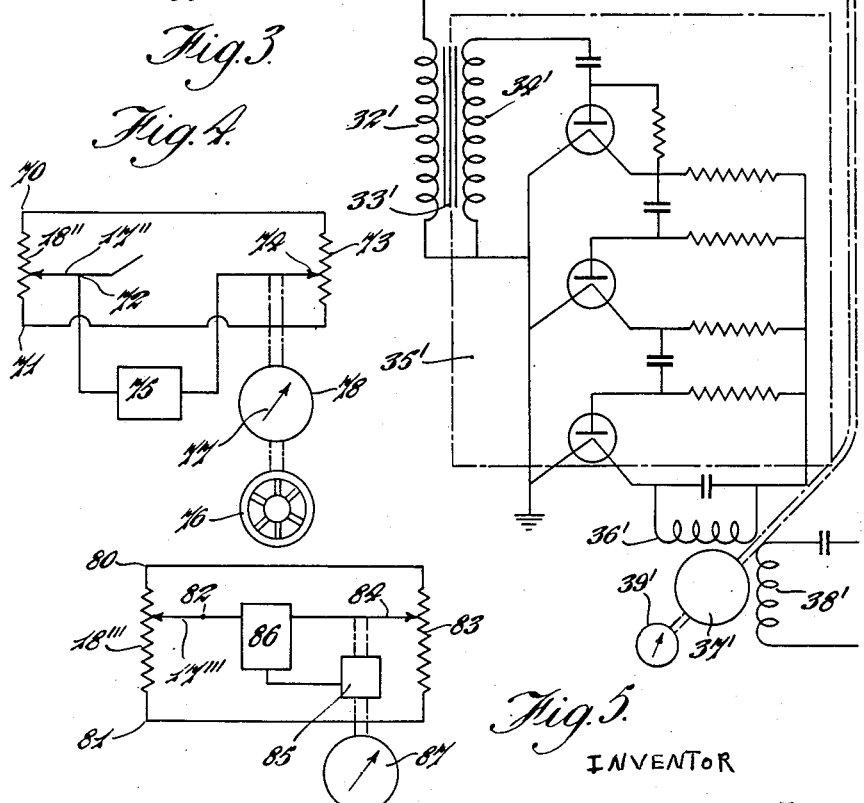
INVENTOR
GORDEN VICTOR GREATOREX
BY
Watson, Cole, Grindle & Watson
ATTORNEYS United States Patent Office 2,924,098
Patented Feb. 9, 1960

2,924,098

CIRCUITS FOR OBTAINING INDICATIONS DEPENDENT ON CAPACITANCE

Gordon Victor Greatorex, Penarth, Wales, assignor to Simmonds Aerocessories Limited, Pontypridd, Wales Application June 19, 1957, Serial No. 666,592

Claims priority, application Great Britain June 19, 1956

7 Claims. (Cl. 73—304)

This invention relates to electrical circuits capable of furnishing an indication dependent on small capacitance changes: the invention more particularly but not exclusively relates to liquid contents gauges having a capacitor located in the liquid reservoir so that its capacitance is dependent on the depth of the liquid and means sensitive to change in this capacitance to give an indication in terms of volume or mass of liquid.

Gauges of the above kind are commonly used in aircraft fuel tanks but when, as will normally be the case, a gauge may have to be used with a variety of grades of fuel serious errors in the indication may be introduced by difference between the dielectric constant of a particular fuel and that for which the gauge was calibrated; in extreme cases errors of the order of ±8% are to be expected with gauges reading in terms of mass and ±19% with gauges reading in terms of volume.

Various liquid contents gauges have been proposed which are designed to avoid these errors by compensation for change in the dielectric constant of the liquid to be gauged, but the compensation has often been insufficient or the gauge too delicate or cumbersome. The main object of the invention is to provide a circuit enabling the production of an improved gauge which for practical purposes eliminates errors due to change of dielectric constant and which is also simple and light in weight.

The circuit according to the invention comprises a pair of bridges in each of which the center-tapped secondary of a transformer provides a pair of inductive arms and a fixed first capacitor and a second capacitor the capacitance of which is unknown or subject to variation are connected to provide the other pair of arms, an electrical connection between the center taps (e.g. by earthing them), a voltage divider connected across the primary of the second transformer and arranged for connection to the same supply as the first transformer, a servomotor arranged to operate the voltage divider, an amplifier connected to the points of the bridges opposite the center-taps to supply the servomotor, and means to indicate the position of the servomotor (e.g. a pointer geared thereto) the arrangement being such that when the bridges are unbalanced the servomotor operates the potential divider in a direction to balance the bridges.

Two main embodiments of the invention and various ancillary devices will now be described by way of example with reference to the accompanying drawings, in which:

Figure 3 shows schematically a second circuit for a gauge such as just mentioned, and Figures 4 and 5 illustrate diagrammatically two ancillary devices.

Figures 1, 2:
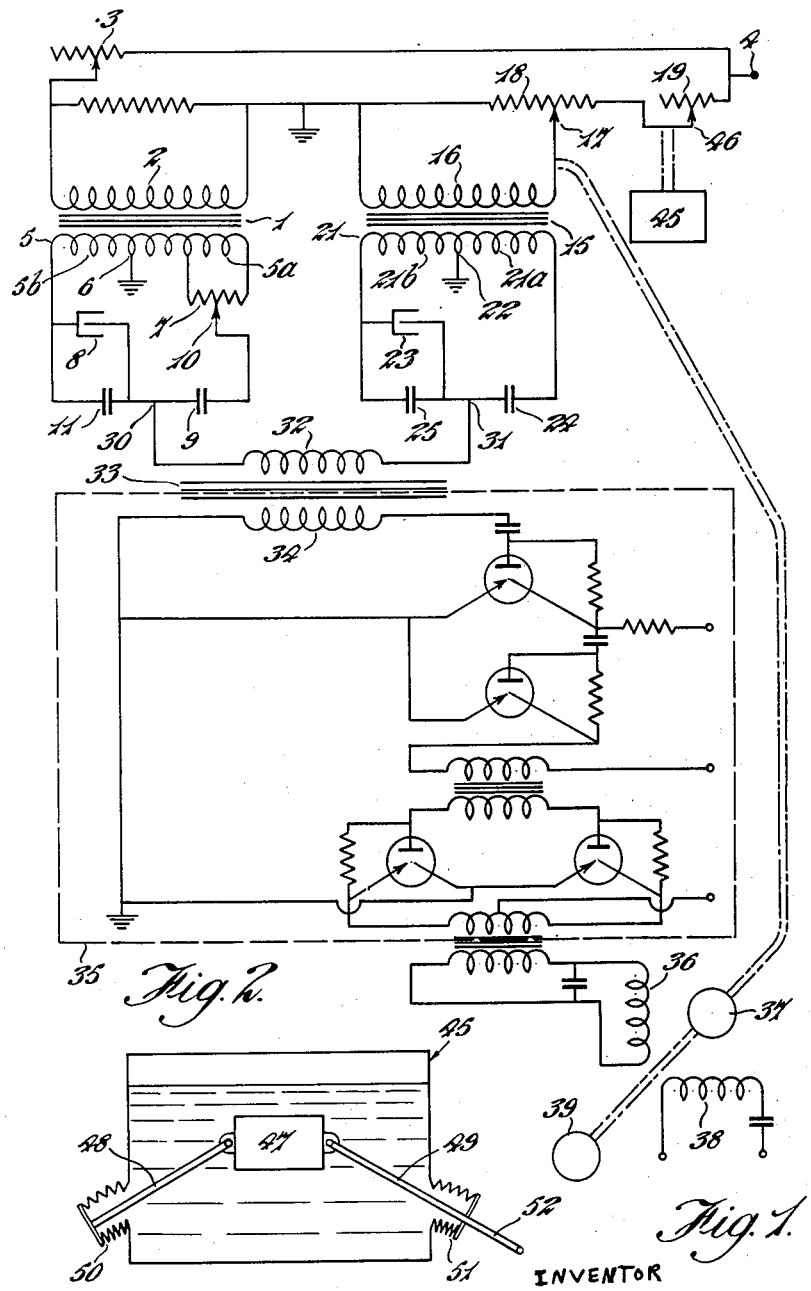
Figure 1 shows schematically a first circuit for a liquid contents gauge compensated for variation of dielectric constant and specific gravity.
Figure 2 is a vertical section of a float unit for use in applying the specific gravity compensation.

Referring to Figure 1, a transformer 1 has its primary 2 connected in series with a rheostat 3 between earth and a supply terminal 4; the supply may for example be 115 volts single-phase A.C. at 400 cycles and may be provided by an oscillator. The secondary 5 of the transformer 1 is center-tapped at 6 to earth, whereby two tightly coupled equal inductive arms 5a, 5b are provided. A potentiometer 7 is connected across some turns of the arm 5a. A capacitor 8 located in the liquid to be gauged so that its capacitance is dependent on the liquid level is connected in series with a balancing capacitor 9 between the wiper 10 of the potentiometer 7 and the free terminal of the inductive arm 5b: the capacitor 11 in parallel with the tank capacitor 8 represents the dead capacitance of the tank and leads.

A second transformer 15 has its primary 16 connected between earth and the wiper arm 17 of a potentiometer 18 which is connected through a further potentiometer 19 to the supply terminal 4. The secondary 21 of the transformer 15 is center-tapped at 22 whereby, as with the transformer 1, two tightly coupled equal inductive arms 21a, 21b are obtained. A capacitor 23 is located for total immersion in the liquid to be gauged so that its dielectric is formed entirely by that liquid and is connected in series with a balancing capacitor 24 across the free terminals of the inductive arms 21a, 21b: the capacitor 25 in parallel with the capacitor 23 represents the dead capacitance of the tank and leads.

As will be understood from the foregoing, the inductive arms 5a and 5b, and capacitive arms 9 and 8 and 11 form one A.C. bridge and the arms 21a, 21b and 24, 23 and 25 form a second A.C. bridge. Corresponding points 30, 31 on either bridge are connected through the primary 32 of a transformer 33 the secondary 34 of which is connected to a transistor amplifier circuit designated generally 35 the construction and operation of which will be well understood from the figure by those skilled in the art and which will not therefore be described in detail. The amplifier output is connected to one winding 36 of a servomotor 37, the other winding 38 of which is supplied from a fixed-potential source. The shaft of the servomotor is mechanically coupled to the wiper arm 17 of the potentiometer 18 and to an indicator 39 which is arranged to show the proportion of the turns of the potentiometer across which the transformer primary 16 is connected. The indicator is calibrated in terms of mass.

A float-operated device designated generally 45 is mechanically coupled to the wiper arm 46 of the rheostat 19 to vary the effective resistance thereof in proportion to the specific gravity of the liquid to be gauged. Referring to Figure 2, the device 45 comprises a cylindrical light-metal "float" 47 disposed in the tank for total immersion of the liquid (e.g. in a sump) and carried symmetrically between opposite walls of the tank by means of equal rods 48, 49 each pivoted to a bracket on the float at one end and rigidly secured at the other end to the free end of a bellows 50, 51, the other end of each bellows being fixed rigidly to the tank walls. An extension 52 of the rod 49 on the exterior of the tank is provided for operation of the wiper arm 46.

In use of the gauge the variable resistors 7 and 3 are adjusted to give correct readings on the indicator 39 for "empty" and "full" indications respectively. To obtain the best compensation for change of dielectric constant the following relation must be established $$\frac{\text{Capacitance 11}}{\text{Capacitance 8}} = \frac{\text{capacitance 25}}{\text{capacitance 23}}$$

(with tank empty)

It may be shown mathematically on the basis of normal assumptions that the compensation for change of dielectric constant is perfect at five points between full and empty indications and tolerable over this whole range in the light of the most stringent practical requirements.

Mass indications are normally required in aircraft fuel gauges but accurate volume indications can be obtained if desired by disabling or removing the specific gravity compensation means 45, 19. As is well known, and has been mentioned above, volume indications in uncompensated gauges are subject to even more serious errors due to dielectric constant changes than are mass indications.

The gauge illustrated has various advantages over known gauges compensated for change of dielectric constant. The weight of the gauge, excluding capacitors 8 and 23 and their leads and the float-operated device 45 can be reduced to between one and two pounds by appropriate design within the ordinary skill of an engineer versed in the electronic art, and if necessary (e.g. on small aircraft) an oscillator power supply operated by the usual D.C. batteries can be provided which is of about the same weight. Moreover none of the circuit components is particularly difficult to make: there is no need for example to use ganged accurately matched rheostats.

A further advantage lies in the high sensitivity of the gauge despite changes in the bridge ratio arms containing the capacitors 8 and 23 which changes are very small compared to the capacitance in those arms.

The second circuit, illustrated in Figure 3 has the same main advantages and is generally similar to the first circuit except for the connection between the bridges and the amplifier: circuit components similar to those of Figure 1 are given the same numerals as in that figure, distinguished by a prime.

In the first circuit the points 30, 31 on the bridges are connected through the primary 32 of the transformer 33 feeding the amplifier circuit 35: in the second circuit the points 30', 31' are connected together and to earth through the transformer primary 32'. This second arrangement has the advantage of greatly reduced impedance in circuit with the primary 32' but requires the live tank and compensator capacities (8' and 23') to be about equal.

Besides the main difference between the first and second circuits it will be seen that the amplifier circuit 35' of the second circuit is simpler compared with the first circuit illustrated, the circuit 35' gives a better stability of the control loop by feeding the D.C. component of the output transistor through the servomotor winding. This gives a damping force proportional to motor velocity and enables faster response for full scale deflection and less hunting. In addition the "set empty" and "set full" arrangements are different in the second circuit: the former comprises resistors 61, 62 respectively which each shunt some central turns on one of the bridge transformer secondaries 5', 21', and which have wipers 63, 64 respectively, connected to earth. Switches 65, 66 are provided in connection to the primaries 2', 16' of the bridges to simplify the setting up of the circuit; each bridge is set up separately with the switch associated with the other bridge open. The variable resistor 3' enables adjustment of the circuit for correct "full" indication.

The first and second circuits can both be modified in various ways. Figure 4 shows an arrangement to facilitate loading and unloading of a tank with which a liquid contents gauge is used, the gauge having either the first or the second circuit. To incorporate the illustrated arrangement with either circuit the points 70, 71, 72 are connected to opposite sides of the potentiometer 18 or 18' and to the wiper arm 17 or 17', respectively: either potentiometer and wiper arm of the first or second circuit is designated 18", 17" respectively in this figure and it will be understood that these numerals do not indicate any piece of apparatus additional to what is shown in those circuits. The points 70, 71 are connected to opposite sides of a second potentiometer 73 which is similar to the potentiometer 18" and which has a wiper arm 74: a relay box 75 is connected between the point 72 and the wiper arm 74 and is such as to close a contact when the potential across it becomes zero. The wiper arm 74 is mechanically connected with a hand wheel 76 and a pointer 77 moving over a dial 78 marked in mass of fuel. The hand wheel 76 is adjusted to set the pointer 77 at a given fuel quantity on the dial 78, and filling or emptying of the tank is begun. As soon as the desired fuel quantity is contained in the tank the potentials across the box 75 becomes equal and the contacts therein are closed: this can be arranged to show a warning light, or stop a pump.

Figure 5 shows a repeater unit adapted to provide an indication similar to that of the gauge 39 or 39' and at a position remote therefrom. To connect the unit with either of the two circuits described above, the points 80, 81, 82 are connected to opposite sides of the potentiometer 18 or 18' and to the wiper arm 17 or 17', respectively: either potentiometer and wiper arm of the first or second circuit is here designated 18''', 17'''. The points 80, 81, are also connected, respectively, to the opposite sides of a potentiometer 83 having a wiper arm 84. The wiper arm is mechanically driven by a motor 85 controlled by the output from an amplifier circuit 86 fed with the difference in potential between the wiper arm 17''' and 84, and the motor is also mechanically coupled to an indicator 87. The motor, amplifier circuit and indicator can take the forms indicated in the first two circuits, and it will be seen that, as in those circuits, the motor 85 sets the wiper arm 84 to zeroize the potential across the amplifier circuit 86. The positions of wiper arms 17''' and 84 therefore correspond and so do the readings of the indicators 87 and 39 or 39'.

The float-operated density correction arrangement 45, 19 or 45', 19' in the first and second circuits can be replaced by any variable resistor controlled in accordance with density, e.g. a manually-set potentiometer, and, as has been mentioned above, if a volume reading is wanted on the indicator 39 or 39', the density correction arrangement can be omitted altogether.

Either of the two circuits illustrated can be modified to provide indications due to small capacitance changes in general as opposed to those concerned particularly with liquid contents and dielectric constant changes. In the first circuit, for example, capacitance can be measured by using one or more fixed capacitors in place of capacitors 8 and 11 and by introducing the unknown capacitance in place of the capacitor 22. The unknown capacitance may for example be that of a capacitor formed by one fixed and one moving electrode, and accurate distance measurements can then be made by suitable calibration of the indicator 39.

It will be appreciated that in the second circuit the transformer secondaries 5' and 21' are, strictly speaking, not provided with a direct central earth connection. Nevertheless since only a few turns of each secondary are bridged by a resistor the effect of this arrangement is the same as that of a central connection, as far as the working of the circuit after initial setting up is concerned.

I claim:

1. For indicating small capacitance changes: an electric circuit comprising first and second transformers each having a primary, a secondary and a center tap on the secondary; a connection between the center taps; first and second electrical bridges each having a pair of inductive arms provided by the secondary of one transformer and a pair of capacitive arms provided by a fixed and a variable capacitor respectively, the variable capacitor of the first bridge being subject to the aforesaid changes; a variable resistor associated with the second transformer through which resistor the primary is supplied; a servo motor mechanically connected to operate the variable resistor; an amplifier connected to each bridge at the point thereof opposite the center tap thereof and arranged on unbalance of said bridges with respect to each other as regards amplitude to actuate the servo motor to operate the variable resistor for re-balancing the bridges with respect to each other as regards amplitude; and an indicator to indicate the position of the servo motor.

2. A circuit as claimed in claim 1, wherein the amplifier is arranged to be fed through a transformer having its primary connected between said bridge points.

3. A circuit as claimed in claim 1, wherein said bridge points are directly connected to each other and are connected to the center tap potential through a primary of the transformer by which the amplifier is fed.

4. A liquid contents gauge comprising a first capacitor constructed and arranged for capacity variation on change of liquid contents of a container, a second capacitor constructed and arranged whereby its capacity varies on change of dielectric constant of the liquid but is independent of liquid contents, first and second transformers each having a primary and a secondary, interconnected center taps one on each transformer secondary whereby to provide first and second pairs of inductances, third and fourth capacitors of fixed value in operation of the gauge, electrical connections between the first inductances and first and third capacitors to form a first bridge, further electrical connections between the second inductances and second and fourth capacitors to form a second bridge, servo-operated means to vary the relation between the potentials applied to the transformer primaries, control means connected to each bridge between the capacitors thereof for actuating the servo-operated means whereby the magnitude of unbalance of the bridges is brought to equality and indicating means responsive to the setting of the servo-operated means.

5. A gauge as claimed in claim 4 arranged to read in terms of mass, wherein a device is located in series with the transformer primary of one bridge which device has a resistance adapted to be varied in dependence on the density of the liquid.

6. A gauge as claimed in claim 4, wherein the servo-operated means comprises a variable resistor connected between a power supply connection for the gauge and the primary of the second transformer and a servo-motor to operate the variable resistor, and the gauge further comprises a manually-settable potentiometer connected across the variable resistor and means to compare the voltage fed to said second transformer primary from the variable resistor with the voltage at the potentiometer wiper, said means being adapted to give a signal on equality between said voltages.

7. A gauge as claimed in claim 4, wherein the servo-operated means comprises a variable resistor connected between a power supply connection for the gauge and the primary of the second transformer and a servo-motor to operate the variable resistor, and the gauge further comprises a potentiometer connected across the variable resistor and means to compare the voltage fed to the secondary transformer primary from the variable resistor with the voltage at the potentiometer wiper, a second servo motor controlled by voltage difference at the voltage-comparing means and mechanically connected to the potentiometer wiper whereby to move the wiper to zero-ize said voltage difference, and an indicator mechanically connected to the servo motor whereby to enable liquid contents indications to be had at a location remote from said indicating means.

References Cited in the file of this patent

UNITED STATES PATENTS

| | | |
|---|---|---|
| 2,188,628 | Freystedt | Jan. 30, 1940 |
| 2,563,281 | Griffith | Aug. 7, 1951 |
| 2,581,085 | Edelman | Jan. 1, 1952 |
| 2,689,932 | Hornfeck | Sept. 21, 1954 |
| 2,724,272 | De Giers | Nov. 22, 1955 |